United States Patent [19]
Kantola et al.

[11] 3,866,639
[45] Feb. 18, 1975

[54] TREE TRIMMING AND TRANSPORTING MACHINE

[75] Inventors: Mikko Kantola, Haukilahti; Paavo Haataja, Rajamaki, both of Finland

[73] Assignee: Tyotehoseura R. Y., Helsinki, Finland

[22] Filed: Oct. 30, 1973

[21] Appl. No.: 411,062

[30] Foreign Application Priority Data
Nov. 2, 1972 Finland.............................. 3072/72

[52] U.S. Cl............................... 144/2 Z, 144/208 B
[51] Int. Cl................................................ B27c 9/00
[58] Field of Search............ 144/2 Z, 208 R, 208 B, 144/208 F

[56] References Cited
UNITED STATES PATENTS

| | | | |
|---|---|---|---|
| 2,599,090 | 6/1952 | Clark et al. | 144/208 B |
| 2,647,548 | 8/1953 | Guettler | 144/208 B |
| 3,385,331 | 5/1968 | Bronemo et al. | 144/2 Z |
| 3,489,190 | 1/1970 | Voronitsyn et al. | 144/2 Z |
| 3,624,756 | 11/1971 | Mellgren | 144/2 Z |

Primary Examiner—Andrew R. Juhasz
Assistant Examiner—W. D. Bray
Attorney, Agent, or Firm—Richards & Geier

[57] ABSTRACT

A tree trimming and transporting machine, used in connection with a tractor or equivalent and having a load space for collecting and transporting felled trees. The machine is able to do the trimming while moving about, collecting more trees or transporting a completed load to its desired destination, thus saving time. The invention is particularly characterized by the provision of belt or equivalent conveyors, transverse to the untrimmed trees, on the bottom and optionally also on one vertical side of the load space and of stationary knife-like trimming blades fitted adjacent to said conveyors and substantially parallel with their plane. The cross-cut trees are urged against the blades and mutually displaced and rubbed under effect of the conveyors, resulting in trimming of their branches, and the machine may be on the move during this operation. Various favourable optional arrangements of the conveyors and blades are disclosed.

4 Claims, 4 Drawing Figures

TREE TRIMMING AND TRANSPORTING MACHINE

The present invention concerns a tree trimming and transporting machine, which is mobile in connection with a tractor or another cross-country vehicle and has a load space in which a tree load is gathered, e.g. for transporting to the side of a motor road, and in which machine trimming is carried out by the use of conveyors which are transverse with reference to the trees and cause shifting and rubbing of the trees against each other.

There are many kinds of forestry machines intended for tree trimming, most of which accomplish the trimming proper well and rapidly. However, they have the drawback that while trimming is being carried out all the other steps of the work are stopped. From the Finnish Pat. No. 42,019 a machine is known wherein the consecutive steps of dragging the trees to the machine and of the trimming taking place in the machine are immediately interconnected. Furthermore, certain machines exist in which attempts are made to perform the trimming simultaneously with certain other steps. For instance, from the Finnish Pat. Nos. 43,244 and 45,508 a tree handling machine is known, wherein the trimming of one tree may be carried out while at the same time the next tree is lifted into the machine with the aid of a fetching jib, although these work steps are not fully independent. A drawback of these machines is that the trimmed trees have to be dropped down to the ground singly or as pieces, whence they are separately made up into loads for transportation along a long distance transport route, such as to a place of storage located on the side of roads. These additional work steps detract from the feasibility of arrangements aiming at a saving of costs.

The aim of the present invention is to provide a tree harvesting machine by the use of which these drawbacks may be eliminated. In order to achieve this, the features principally characterizing the invention are that said conveyors driven by a motor have been disposed on the bottom of the load space or on said bottom and on one vertical side of the load space and that in connection with said conveyors stationary, knife-like trimming blades have been fitted substantially parallel with the conveyors' plane; the urging of the cross-cut trees and their displacement and rubbing against each other under effect of the conveyors causes them to be trimmed of their branches, while at the same time the trimming and transporting machine may be moving for the purpose of making up a load or transporting the load to its destination.

It is possible, by means of this invention, continuously and without need to wait for the trimming step to be accomplished, to lift, e.g. with the aid of a separate loader, with a felling device mounted on a loader or with a telescopic or articulated crane mounted on a tractor, untrimmed trees singly or in pieces simultaneously while the trees previously loaded into the machine are trimmed of their branches as they move with reference to the trimming blades, drawn by the engagement dogs on the conveyor bands mounted transversally to the load and as they move upwardly along one side of the load and as they rub against each other. Trimming blades have also been installed under the load space, whereby parts of the branches are lopped off and fall through the apertures between the tree conveyors and trimming blades down under the vehicle already while the trees resting on the lower bunks of the load space are moving towards the side of the load space and towards the blades found there. These trees are urged downwardly not only by their proper weight but also due to the fact that the trees lying over them by their weight help the underlying trees to keep as close as possible to the knifelike trimming blades under them, which in their turn are most appropriately mounted horizontally and in such manner obliquely that they cut the branches off in an oblique direction, whereby the force required for trimming is reduced. The trimming blades may be detachable and their number may be increased or decreased in accordance with tree species, stoutness of the trees, density and number of branches, season and other factors imposing different requirements. If the branches are particularly thick, then some of the trimming knives, in the first place those under the load space, may be replaced with rotary blades of the cutter type.

Owing to the continuous action trimming applied in the trimming and transporting machine according to the invention, simultaneous trimming of several trees may also be carried out while the machine is moving; it is also possible to perform trimming while the trees loaded into the machine are being transported out of the forest to the roadside storage place. It is thus understood that no time at all is needed which would be specifically allotted for the trimming of trees, because the trimming can be fully accomplished during the period required for loading the trees into the machine and for driving the load to the roadside storage place. In other words, by means of the present invention the time previously spent in trimming the trees may be virtually totally eliminated when the machine of the invention is used. In addition, while rubbing against the trimming blades and each other the trees are also barked to some degree, the trimming and barking waste falling down on and beside the track along which the machine travels. If it is particularly desired also to perform barking with the machine, it is possible furthermore to mount actual barking blades on the machine. The invention may also be carried out so that the end in the driving direction of the conveyor bands mounted on the bottom of the load space is so positioned that when the side supports or the vertical conveyors are let down the moving conveyor bands will discharge the load to one side of the vehicle. In this manner the trimming conveyor of the vehicle also operates as an unloader. It is also possible to mount behind the load space a circular saw, which cuts off the top ends of the trees as desired.

The other details of the invention can be learned from the attached drawings presenting the invention.

In the following an embodiment of the invention is described with reference to the figures in the accompanying drawing, while it should be noted that the invention is in no way confined to the design solutions presented therein.

Figure 1:
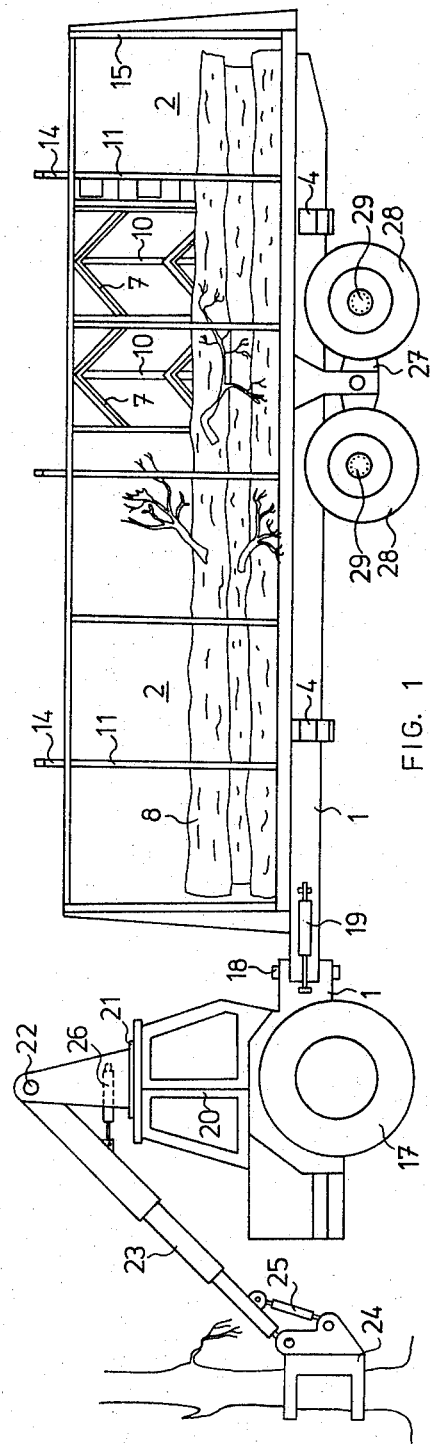
FIG. 1 shows in elevational view a trimming and transporting machine according to the invention, mounted behind a body pivot-steered cross-country vehicle, and which machine additionally comprises a telescopic jib with felling device.

The tree trimming and transporting machine consists of a cross-country vehicle 1 having a load space 2 limited by bottom bunks, side supports 11 and a rear board 15, into which load space the tree load is collected while the machine is travelling in the forest. The cross-country vehicle 1 has been shown as a vehicle steered by means of its pivoted body, and it has a traction and steering unit comprising front wheels 17, driving cab 20 and a body pivot 18. Turning is accomplished about the body pivot 18 by power cylinders 19. The driver's cabin 20 carries on its roof a swivel bearing 21 with an attached fork, in which a telescopic jib 23 is carried by a horizontal pivot 22, it being equally possible to use an equivalent articulated jib in place of the telescopic jib. The jib 23 carries on its distal end, for instance, a hydraulically operated felling device 24 known by itself, this felling device being used to cut the tree off at its base and to transfer it, held in the felling device 24 and in untrimmed condition, into the load space 2. The felling device 24 can be swivelled in the vertical plane by means of a swivelling cylinder 25, and the jib is similarly swivelled by means of the cylinder 26. On the bottom of the load space 2 conveyors 4 substantially arranged in a horizontal plane have been provided, which consist a conveyor bands, such as chains, spaced with reference to each other and driven by a motor 3, preferably a hydraulic motor. The return wheels 12 have been placed adjacent to the side of the load space 2 and they are driven by the motor 3 over a common, long shaft 16. In addition to the horizontal conveyor 4, on one long vertical side of the load space vertical conveyors 5 similarly constituted by conveyor bands may be fitted, which are driven by the same motor 3 as the horizontal conveyors 4, over the shaft 16. The conveyor bands of the horizontal and vertical conveyors 4, 5 carry spaced, rod-like engaging so-called dogs 9 at a spacing which exceeds or substantially equals the diameter of the largest trees.

The load space 2 resembling a trailer has a turnable bogie 27 with wheels 28, which most appropriately are traction wheels and are provided with hydraulic motors 29 fitted into the hubs of the wheels 28.

Figure 2:
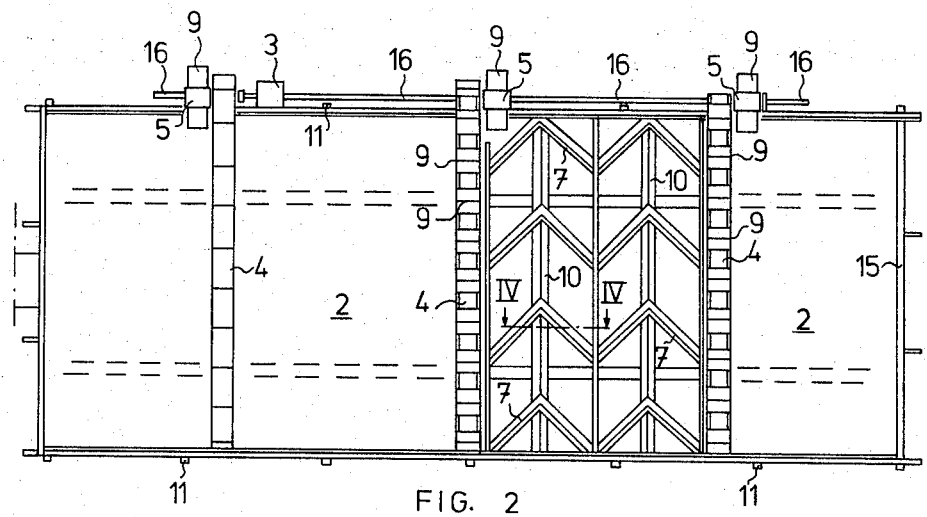
FIG. 2 shows, as viewed from above, the load space of the machine of FIG. 1.
Figure 4:
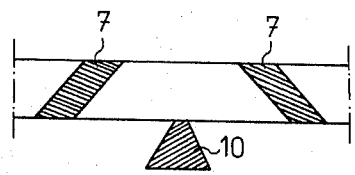
FIG. 4 is an enlarged section along line IV—IV in FIG. 2.

On the bottom of the load space 2, knife-like trimming blades 7 have been mounted substantially in a horizontal plane, virtually covering the entire load space bottom area, although in FIG. 2 for the sake of clarity such trimming blades 7 have been shown only on a part of the length of the load space. As already stated, the trimming blades 7 are knife-like and they have a cutting edge, which is shown in cross section in FIG. 4. The trimming blades 7 have been mounted in V configuration on transverse supports so that the latter form on the bottom of the load space a sparse grating, into the apertures of which the branches of the trees may enter. The V-point of the V-shaped trimming blades 7 has been attached to the central support 10 of the blades, which has the cross section shown in FIG. 4.

The central supports 10 of the blades are parallel with the direction of motion of the conveyors 4,5. Trimming blades 7 of a similar kind have also been provided adjacent to the vertical conveyor 5, on one vertical side of the load space and covering its entire length. Part of these trimming blades 7 have been shown in FIG. 1.

Figure 3:
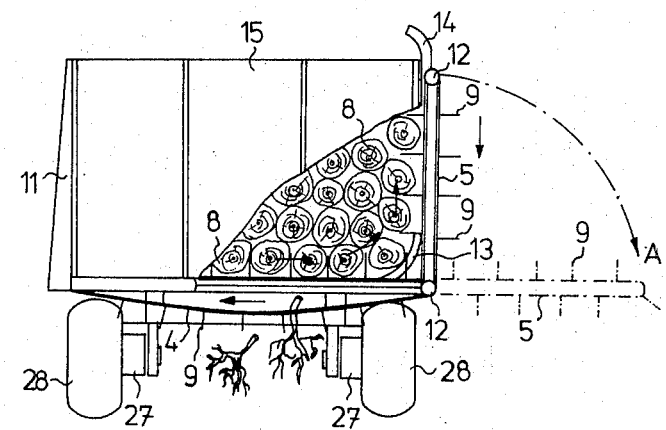
FIG. 3 shows the trimming and transporting machine viewed from the rear and with the rear board partially cut away.

The operation of the trimming and transporting machine described is in its principal features as follows. The machine moves about in the forest, collecting a tree load. The felling device 24 cuts the tree and the jib 23 transfers the tree untrimmed into the load space 2. The top end of the tree may be cut off for instance by the aid of a circular saw placed adjacent to the tailboard 15 or elsewhere. The cut trees 8 transferred into the load space 2 begin to be displaced by the conveyors 4, 5, whereby the branches are cut off by slicing under effect of the trimming blades 7. The branches are also partly broken off and trimmed when the trees 8 are urged, and rub, against each other. In this connection at least partial barking of the trees is also obtained, which may be further boosted by means of special barking blades placed adjacent to the trimming blades or elsewhere (not depicted). In FIG. 3, arrows indicate the movements of the trees 8 when the trimming is in progress with the aid of the conveyors 4, 5 and the trimming blades 7. The lopped branches fall through the bottom and side of the load space down onto the path of the machine. The load space 2 has in its lower corner, at the juncture of the conveyors 4 and 5, curved guides 13, which prevent the trees from being packed in the corner of the load space 2. To the upper margin of the side provided with conveyors 5 of the load space 2 inwardly curving guides 14 have been affixed, which prevent the trees lifted up by the conveyors 5 from falling out from the load space 2 and direct the trees toward the central part of the load space 2. The trimming and barking step just described may be in progress all the time while the machine is collecting trees in the forest. The trimming also continues during the time the machine is transporting a whole load, e.g. to a roadside. It is thus understood that one and the same tree will be displaced several times by the conveyors 4, 5 the severance of all branches is positively assured, and that no specific time of its own is required for the trimming operation.

In FIG. 3 an advantagous embodiment of the invention is seen, according to which the side supports 11 and the vertical conveyor 5, if any, can be turned down (Arrow A) into the horizontal position indicated by dot-and-dash lines. It is then possible to discharge the load to one side by operating the conveyors 4, 5 and it is not necessary to design any dumping feature for the load space. This is a considerable advantage, which increases the efficiency of the machine.

When short dimension timber, such as pulpwood, is harvested the direction of motion of the conveyors 4 may be arranged to be longitudinal to the load space 2, i.e., at right angles to the conveyor 4 and 5 shown in figures. The trees will then lie transversally with reference to the length of the load space 2 and to the direction of travel of the machine. The trimming blades 7 are then also turned through 90° from the position of the blades shown in the figures. Instead of the tailboard 15 or adjacent to it a similar vertical conveyor 5 may be mounted as has been shown on the side of the load space. In this embodiment the cross-cutting circular saw may be particularly advantageously fitted adjacent to the front end of the load space. The trees are brought in with the jib 23 to said circular saw and in a position transverse to the direction of travel of the machine. The circular saw is then used to cut from the tree parts having for instance the length of pulpwood, while the butt end of the tree is supported by the felling device 24 all the time. The conveyor 4 transports the cross-cut trees in transverse position towards the rear in the load space 2, and trimming takes place at the same time. In this embodiment the load can be discharged from the rear of the load space 2 by the aid of the conveyor 4 and by turning the tailboard 15 and/or the vertical conveyor 5 into horizontal position as has been described.

We claim:

1. A mobile machine for simulaneously trimming and transporting trees, comprising a box-like load space adapted to collect a tree load, conveyors located at the bottom of said load space and on one vetical side thereof, means driving said conveyors, and stationary knife-like trimming blades located within said load space substantially parallel to said conveyors, said conveyors causing a displacement and mutual rubbing of the trees in said load space and trimming them by their rotation against said blades.

2. Tree trimming and transporting machine according to claim 1, characterized in that the conveyors (4, resp. 5) consist of a plurality of conveyor belts transverse to the longitudinal direction of the load space (2) and to the direction of travel of the trimming and transporting machine, and that the conveyor belts carry at substantially equal spacing engaging dogs (9), the spacing of which exceeds the diameter of the largest trees.

3. Tree trimming and transporting machine according to claim 2, characterized in that the knife-like trimming blades (7) have a substantially horizontal oblique position with reference to the direction of travel of the conveyors (4, resp. 5) so that the branches meeting the trimming blades (7) are cut off obliquely by slicing.

4. Tree trimming and transporting machine according to claim 3, characterized in that the trimming blades (7) are V-shaped and affixed by the tip of the V to a central blade support (10), which is substantially parallel to the motion of the conveyors (4, resp. 5).

* * * * *